Dec. 22, 1925.
G. CASH
METHOD OF PREVENTING EVAPORATION FROM STORAGE TANKS
Filed May 4, 1923
1,566,825
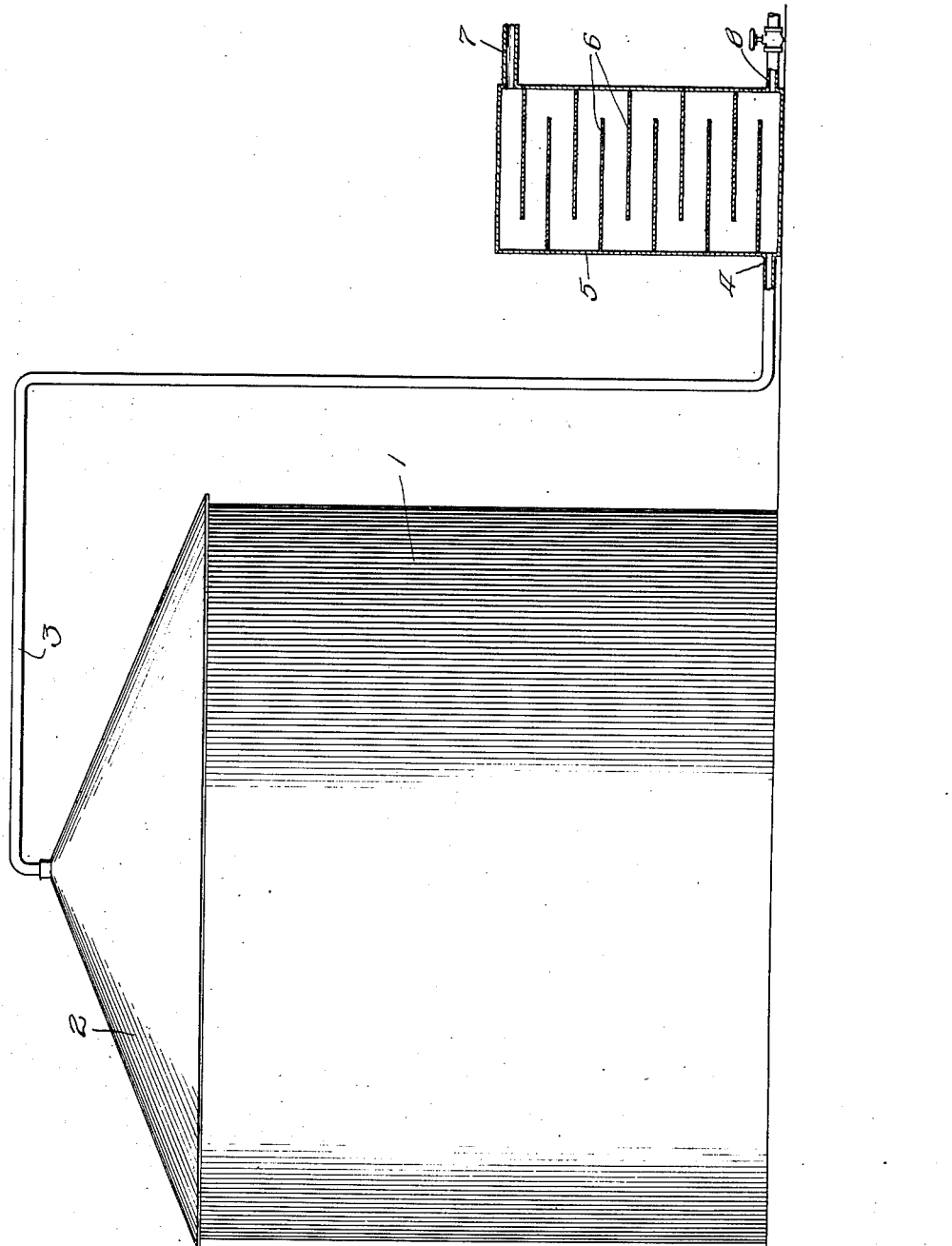
Inventor:
Gentry Cash, Patented Dec. 22, 1925.

1,566,825

UNITED STATES PATENT OFFICE.

GENTRY CASH, OF WHITING, INDIANA, ASSIGNOR TO STANDARD OIL COMPANY, OF CHICAGO, ILLINOIS, AND WHITING, INDIANA, A CORPORATION OF INDIANA.

METHOD OF PREVENTING EVAPORATION FROM STORAGE TANKS.

Application filed May 4, 1923. Serial No. 636,591.

*To all whom it may concern:*

Be it known that I, GENTRY CASH, a citizen of the United States, residing at Whiting, in the county of Lake and State of Indiana, have invented a new and useful Improvement in Methods of Preventing Evaporation from Storage Tanks, of which the following is a specification.

This invention relates to improvements in methods of preventing the evaporation from storage tanks containing liquids having volatile constituents, such as gasoline, crude petroleum and the like.

In the loss of evaporation from storage tanks containing crude petroleum, gasoline, etc., it has been found that an important factor is the so-called "breathing" of the tank, this "breathing" consisting in an expiration or forcing out of air charged with vapor from the upper portion of the tank during the day and the suction of fresh air back into the tank during the cooler hours of the night. The air thus drawn in in turn becomes charged with gasoline vapors and during the following day or a warmer period is forced out of the tank, carrying with it a quantity of gasoline vapors determined by the vapor pressure of the liquid in the tank. The constant repetition of this process is a very important factor in causing evaporation loss from such tank.

I have found that the evaporation loss from storage tanks may be materially reduced by the method hereinafter described, which is illustrated in part diagrammatically in the annexed drawings.

In accordance with my invention a chamber is provided the capacity of which is somewhat more than the maximum volume of air forced out from the tank during the process of "breathing" hereinafter referred to. The precise volume of this chamber is directly dependent upon the volume of the vapor space in the storage tank itself and may be readily calculated from the volume of free space in the tank by determining its maximum expansion under the varying temperature conditions to which it will be subjected.

The storage tank is directly connected to this chamber by a suitable conduit, which serves as the sole outlet and inlet for air to the tank. The chamber itself is provided with means for obstructing diffusion of gases such as baffles, porous or fibrous filling material or the like, and is provided with an outlet to the atmosphere at a point remote from the inlet to the chamber of the conduit from the storage tank. In order to take advantage of the relatively great density of the vapors forced out of the tank, the inlet from the tank into the chamber is preferably placed at or near the bottom of the latter, and the outlet from the chamber to the atmosphere is provided at or near the top of the chamber.

In the accompanying drawings illustrating the invention, the numeral 1 indicates diagrammatically a storage tank of any suitable construction surmounted by a tight roof 2 provided with a vent pipe 3 leading to the inlet 4 of a closed chamber 5. The latter is provided with a considerable number of transverse baffles 6, and its sole outlet to the atmosphere is at 7. A suitable valved drain pipe 8 may be provided near the bottom of the chamber 5. The inlet 4 for the vent pipe 3 is shown near the bottom of the chamber 5 and the outlet 7 is substantially at its top.

During periods in which expansion of the contents of the tank 1 takes place, the air charged with gasoline vapor passes out through the vent pipe 3 into the chamber 5, the capacity of which is somewhat more than the maximum total expansion of the contents of the tank under conditions ordinarily used. The chamber 5 is, of course, already filled with air and the provision of the baffles or other diffusion obstructing means substantially prevents turbulence of the contents of the chamber resulting from the introduction or withdrawal of gas thereinto. The baffles 6 likewise reduce diffusion to a marked extent, with the result that the air forced out from the chamber 5 by the introduction of the gasoline charged air in the tank is substantially free from gasoline vapor.

On contraction of the contents of the tank air is sucked thereinto through the pipe 3 from the lower portion of the chamber 5. The air contained in the lower portion of the chamber is the portion containing the highest proportion of gasoline vapors forced into the chamber by the previous expansion of the contents of the storage tank. This portion is thus sucked into the tank again, and by reason of its high proportion of gasoline vapors, materially decreases or may even substantially prevent further evaporation of the contents of the tank. During this period of contraction of the contents of the tank, fresh air is drawn into the chamber 5 through the outlet 7, but this fresh air is prevented by the baffles from mixing to any substantial extent with the gasoline charged air which is being withdrawn into the tank.

Although this invention has been described in connection with the specific details of a method and apparatus for carrying it into effect it is not intended that these details shall be regarded as limitations upon the scope of the invention excepting in so far as included in the acompanying claims.

I claim:

1. A method of preventing evaporation losses from storage tanks which consists in freely connecting the vapor vent of such a tank with a chamber open to the atmosphere whereby vapors from the tank are discharged into said chamber and are retracted therefrom into the tank on contraction of the contents of the latter, and means for maintaining the gaseous contents of the chamber in quiescence between the inlet to the chamber from the tank and its outlet.

2. The method of preventing evaporation loss from storage tanks containing gasoline and like volatile liquids which comprises discharging vapors from the tank during expansion of its contents into a chamber of greater capacity than the volume of discharged vapors, providing an outlet from said chamber, maintaining quiescence in its gaseous contents between the inlet from the tank and the outlet from the chamber and obstructing diffusion therein, and withdrawing from the chamber into the storage tank during contraction of the contacts of the latter, the vapors previously discharged into the chamber from the tank.

3. In apparatus for preventing evaporation of stored liquid such as gasoline from storage tanks, a vented tank, a chamber, means for conducting vapors from the vent of the tank into the chamber and back, an outlet from said chamber at a point remote from its inlet, and means within said chamber for obstructing diffusion and maintaining quiescence of its gaseous contents.

4. In apparatus for preventing evaporation of stored liquid such as gasoline from storage tanks, a vented tank, a chamber, means freely connecting the vent of the tank with an inlet to the chamber, an outlet from the chamber to the atmosphere at a point remote from its inlet, and transverse baffles within the chamber between the inlet and the outlet thereof.

5. In apparatus for preventing evaporation of stored liquids such as gasoline from storage tanks, a vented tank, a chamber having an inlet substantially at its bottom, means freely connecting the vent of the tank with the inlet to the chamber, said chamber having an outlet to the atmosphere at its top, and transverse baffles within the chamber between the inlet and outlet thereof.

6. In apparatus for preventing evaporation of stored liquids such as gasoline from storage tanks, a vented tank having an inlet and an outlet removed from each other in a vertical direction, the outlet being above the inlet, means within the chamber between the inlet and outlet for maintaining quiescence therein, and means freely connecting the vent of the tank to the inlet of the chamber.

GENTRY CASH.